United States Patent [19]

Furukawa et al.

[11] Patent Number: 5,726,271
[45] Date of Patent: Mar. 10, 1998

[54] HYDROXYPHENYL-CONTAINING POLYORGANOSILOXANES

[75] Inventors: Haruhiko Furukawa; Yoshitsugu Morita; Tadashi Okawa; Hiroshi Ueki, all of Chiba Prefecture, Japan

[73] Assignee: Dow Corning Toray Silicone, Ltd., Tokyo, Japan

[21] Appl. No.: 755,921

[22] Filed: Nov. 25, 1996

[30] Foreign Application Priority Data

Nov. 29, 1995 [JP] Japan .................. 7-334005
Jun. 25, 1996 [JP] Japan .................. 8-183986

[51] Int. Cl.$^6$ .................................... C08G 77/26
[52] U.S. Cl. .................... 528/29; 528/31; 528/15; 556/449; 556/434; 556/435
[58] Field of Search .................... 556/449, 434, 556/435; 528/29, 31, 15

[56] References Cited

U.S. PATENT DOCUMENTS

| | | | |
|---|---|---|---|
| 3,697,569 | 10/1972 | Mironov et al. | 556/449 |
| 3,879,433 | 4/1975 | Omietanski et al. | 556/449 |
| 5,041,591 | 8/1991 | Okawa | 556/434 |
| 5,130,460 | 7/1992 | Kamei et al. | 556/449 |
| 5,175,328 | 12/1992 | Okawa | 556/451 |
| 5,204,438 | 4/1993 | Snow | 528/25 |
| 5,262,506 | 11/1993 | Okawa et al. | 528/27 |
| 5,357,022 | 10/1994 | Banach | 528/29 |

*Primary Examiner*—Margaret W. Glass
*Attorney, Agent, or Firm*—Timothy J. Troy

[57] ABSTRACT

The present invention relates to a hydroxyphenyl-functional polyorganosiloxane compound having the formula

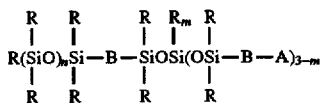

wherein R is independently a monovalent hydrocarbon group free of aliphatic unsaturation, A is a substituted or unsubstituted hydroxyphenyl group, B is selected from the group consisting of alkyleneoxyalkylene groups having at least two carbon atoms and alkylene groups having at least 2 carbon atoms, m is zero or 1, and n is an integer from 0 to 400. The hydroxyphenyl-functional polyorganosiloxanes of this invention are useful as surfactants or as additives for organic polymers.

13 Claims, No Drawings

HYDROXYPHENYL-CONTAINING POLYORGANOSILOXANES

BACKGROUND OF THE INVENTION

This invention relates to novel hydroxyphenyl-functional polyorganosiloxanes. More particularly, this invention relates to novel hydroxyphenyl-functional polyorganosiloxanes that have at least two hydroxyphenyl groups at one molecular chain terminal.

Organofunctional polyorganosiloxanes have a variety of uses, namely as surfactants, fiber-treatment agents, and as additives for organic polymers. The chemical structures of organofunctional polyorganosiloxanes can be differentiated based on the type, number, and bonding position of the organofunctionality, and the nature of the particular application determines the selection of the suitable chemical structure. For example, with regard to an application as an additive for organic polymers and specifically in the case where the organofunctional polyorganosiloxane is used as a precursor to a copolymer in which the polyorganosiloxane is inserted into the organic polymer molecule, one must select an organofunctional group that is copolymerizable with the organic polymer and must very carefully control the group's frequency of occurrence and bonding position. Organofunctional polyorganosiloxanes, for example, can have organofunctionality at both molecular chain terminals or can have one organofunctional group at one and only one molecular chain terminal. Polyorganosiloxanes having organofunctionality at both molecular chain terminals are used as additives for organic polymers prepared mainly by polycondensation, for example, polyesters, polyamides, polycarbonates, and polysulfones. However, the copolymerization of this type of polyorganosiloxane with the monomer precursor for the organic polymer cannot give a copolymer in which the polyorganosiloxane chain branches from the molecular chain of the organic polymer, that is, a so-called graft copolymer. Also, the use of polyorganosiloxanes having one organofunctional group at one and only one molecular chain terminal, do not yield a satisfactory improvement in the properties of the organic polymer product.

In order to solve this problem, Japanese Patent Application Laid-Open No. 4-323222 (323,222/1992) discloses polyorganosiloxanes having at least two organofunctional groups at one and only one molecular chain terminal. However, the polyorganosiloxane described cannot be used as an additive for organic polymers such as polycarbonates and polysulfones because its organofunctional group is limited to an amino, carboxyl, hydroxyl, or epoxy group.

SUMMARY OF THE INVENTION

This invention relates to a novel hydroxyphenyl-functional polyorganosiloxanes having at least two hydroxyphenyl groups at one molecular chain terminal.

It is an object of the present invention to provide novel polyorganosiloxanes having at least two hydroxyphenyl groups at one molecular chain terminal.

DETAILED DESCRIPTION OF THE INVENTION

The present invention relates to a hydroxyphenyl-functional polyorganosiloxane having the formula

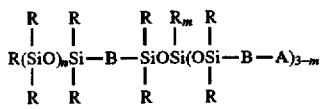

wherein each R is independently a monovalent hydrocarbon group free of aliphatic unsaturation, A is a substituted or unsubstituted hydroxyphenyl group, B is selected from the group consisting of alkyleneoxyalkylene groups having at least two carbon atoms and alkylene groups having at least 2 carbon atoms, m is zero or 1, and n is an integer from 0 to 400.

In the formula above, each R is independently selected from monovalent hydrocarbon groups which are free of aliphatic unsaturation. Specific examples of R are alkyl groups exemplified by methyl, ethyl, propyl, butyl, pentyl, or hexyl, aryl groups exemplified by phenyl, tolyl, or xylyl, and aralkyl groups exemplified by benzyl or phenethyl. The group A is a substituted or unsubstituted hydroxyphenyl group. The group A preferably is a group having the formula:

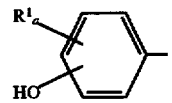

wherein $R^1$ is selected from the group consisting of an alkyl group having from 1 to 4 carbon atoms and an alkoxy group having from 1 to 4 carbon atoms, and a is an integer having a value of 0 to 4. The group A is exemplified by 2-hydroxyphenyl, 3-hydroxyphenyl, 4-hydroxyphenyl, 4-hydroxy-3-methoxyphenyl, 4-hydroxy-2-methoxyphenyl, 3-hydroxy-4-methoxyphenyl, 3-hydroxy-2-methoxyphenyl, 2-hydroxy-4-methoxyphenyl, or 2-hydroxy-3-methoxyphenyl. The group B is an alkyleneoxyalkylene group or alkylene group having at least 2 carbons. The alkylene group is specifically exemplified by ethylene, propylene, butylene, pentylene, or hexylene, while the alkyleneoxyalkylene group is specifically exemplified by ethyleneoxypropylene or ethyleneoxybutylene. The subscript m in the formula for the hydroxyphenyl-functional polyorganosiloxane is 0 or 1. When m is 0 the polyorganosiloxane of this invention has 3 hydroxyphenyl groups at the one end of the molecular chain, and when m is 1 it has 2 hydroxyphenyl groups at the one end of the molecular chain. The subscript n is an integer from 0 to 400 and preferably from 1 to 200. Values for n in excess of 400 cause a decline in the copolymerizability with the precursor monomer for the organic polymer.

Hydroxyphenyl-functional polyorganosiloxanes according to this invention are exemplified by:

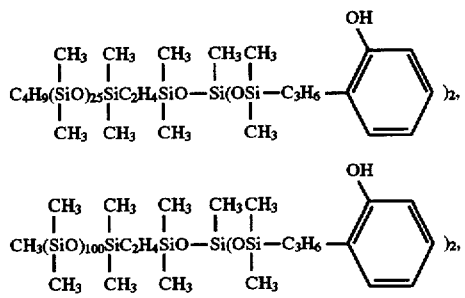

-continued

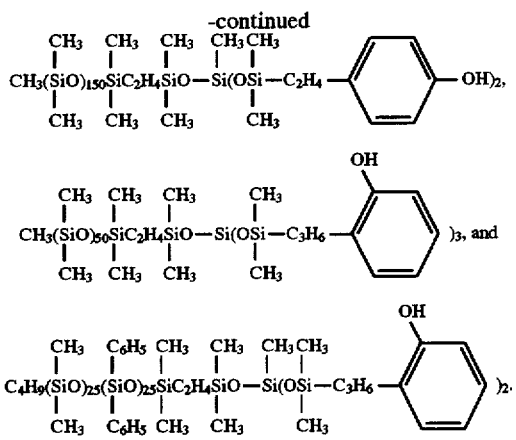

The hydroxyphenyl-functional polyorganosiloxanes of this invention can be prepared, for example, by an addition reaction in the presence of hydrosilylation catalyst, for example, a platinum catalyst, between a polyorganosiloxane having at least 2 silicon-bonded hydrogen atoms at the one molecular chain terminal which are exemplified by compounds having the formula

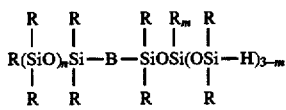

wherein R, B, m, and n are as defined hereinabove, and an aliphatically unsaturated hydrocarbon compound whose molecule contains a phenol group whose hydroxyl group is protected, for example, by a triorganosilyl group, and by subsequently removing the triorganosilyl group by adding an alcohol exemplified by methanol, and heating the mixture in the presence of an acid catalyst. The preparation of the compounds of this invention can also employ an aliphatically unsaturated hydrocarbon compound which contains a phenol group whose hydroxyl group is not protected, for example by a triorganosilyl group.

Polyorganosiloxanes having at least 2 silicon-bonded hydrogen atoms at the one molecular chain terminal can be prepared, for example, by a condensation reaction between an organosilane having the formula

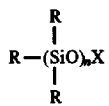

wherein R and n are defined as above and X is a hydrogen or lithium atom, or a siloxane having the formula

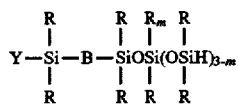

wherein R, B, and m are defined as above and Y is a halogen atom, such as is taught in Japanese Patent Application Laid-Open No. 4-353523 (353,523/1992).

Since the polyorganosiloxanes of this invention have two or more hydroxyphenyl groups at one but only one molecular chain terminal, its copolymerization with monomer precursors for organic polymers will give organic polymers in which the polyorganosiloxane chain is bonded in graft form. The polyorganosiloxanes of this invention are therefore useful as surfactants or as additives for organic polymers exemplified by polycarbonates, polysulfones, polyacrylates, or epoxy resins.

EXAMPLE 1

A mixture of 240 ml of isopropyl alcohol, 120 ml of concentrated hydrochloric acid, and 240 ml of water was cooled on an ice water bath to reach a liquid temperature not exceeding 10° C. This was followed by the introduction of 120.6 grams (g) of 1,1,3,3-tetramethyldisiloxane and then the dropwise addition of 54.5 (g) of methyltrimethoxysilane. After the completion of this addition, the ice water bath was removed and the reaction was stirred for 1 hour. The aqueous layer was then removed and the organic layer was neutralized by the addition of sodium bicarbonate and repeatedly washed with water until the aqueous layer was neutral, and then dried over sodium sulfate. Subsequent distillation under reduced pressure gave 45.5 (g) of a fraction at 97°–98° C./83 mmHg. This fraction was confirmed to be methyltris(dimethylsiloxy)silane by $^1$H-nuclear magnetic resonance analysis (NMR) and infrared spectrochemical analysis (IR).

Next, 120 (g) of the methyltris(dimethylsiloxy)silane was placed in a four-neck flask equipped with a stirrer and a sufficient amount of platinum-tetramethyldivinyldisiloxane complex was introduced to give 20 ppm platinum metal based on the total weight of the reaction mixture (methyltris(dimethylsiloxy)silane plus dimethylvinylchlorosilane). Next, the resulting mixture was heated to 80° C., and then 21.5 (g) of dimethylvinylchlorosilane was added dropwise and the reaction mixture was stirred at 90° C. to 100° C. for 1 hour after the completion of this addition. Analysis of the reaction mixture at this point by gas chromatography (GLC) demonstrated that the peak for the starting dimethylvinylchlorosilane had disappeared, which confirmed completion of the reaction. Distillation under reduced pressure then gave 47.6 (g) of a fraction at 89°–91° C./1 mmHg. Analysis of this fraction by NMR and IR confirmed it to be a silicone compound, designated hereinafter as polymer T, having the average formula

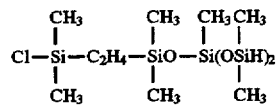

Next, 60 (g) of hexamethylcyclotrisiloxane and 60 (g) of tetrahydrofuran were introduced into a four-neck flask equipped with a stirrer and were cooled with ice water to a liquid temperature not exceeding 20° C. While stirring under a dry nitrogen blanket 32.43 mmol n-butyllithium in n-hexane solution was introduced and stirring was then continued at room temperature. The development of the polymerization reaction during stirring was monitored by GLC analysis of the reaction mixture. The hexamethylcyclotrisiloxane conversion was 98.4% after six hours, at which point 0.66 (g) of triethylamine and then 13.89 (g) of polymer T were added in order to terminate the polymerization reaction. Filtration of the salt by-product and distillation of the solvent and low boilers by heating under reduced pressure then gave a colorless and transparent reaction product. Analysis of this reaction product by NMR, IR, and GPC and iodometric determination of the SiH group weight % confirmed it to be a polyorganosiloxane, designated hereinafter as polymer 1, having the average formula

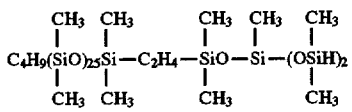

having an SiH group weight % of 0.093%, having a number-average molecular weight (Mn) of 2,288, and a dispersity of 1.13.

Next, 60 (g) of hexamethylcyclotrisiloxane and 60 (g) tetrahydrofuran were introduced into a four-neck flask equipped with a stirrer and were cooled with ice water to a liquid temperature not exceeding 20° C. While stirring under a dry nitrogen blanket, 10.81 mmol of n-butyllithium in n-hexane solution was introduced and stirring was then continued at room temperature. The development of the polymerization reaction during stirring was monitored by GLC analysis of the reaction mixture. The hexamethylcyclotrisiloxane conversion was 98.6% after six hours, at which point 0.22 (g) triethylamine and then 4.63 (g) of polymer T as described above were added in order to terminate the polymerization reaction. Filtration of the salt by-product and distillation of the solvent and low boilers by heating under reduced pressure then gave a colorless and transparent reaction product. Analysis of this reaction product by NMR, IR, and GPC and iodometric determination of the weight percent of SiH confirmed it to be a polyorganosiloxane, designated hereinafter as polymer 2, having the formula

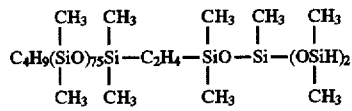

having 0.034 weight % SiH groups, a number-average molecular weight (Mn) of 7,218, and a dispersity of 1.08.

Next, the following were heated together for 2 hours at 100° C.: 30 (g) of polymer 1 (having 27.9 milliequivalents of SiH) as described above, 8.64 (g) of trimethylsilyl-o-allylphenol, and a sufficient amount of platinum-tetramethyldivinyldisiloxane complex to give 10 ppm platinum metal. IR analysis of the resulting reaction mixture then confirmed that the characteristic absorption of the SiH group had disappeared. Distillation of the low boilers from the reaction mixture by heating under reduced pressure then yielded a transparent fluid. Analysis of this fluid by NMR and IR confirmed it to be polyorganosiloxane having the formula

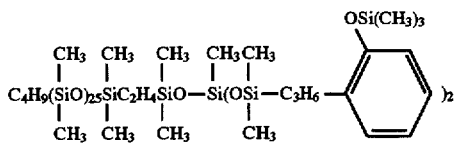

Next, 30 g of this polyorganosiloxane and 7.97 g methanol were mixed and then stirred at 50° C. for 3 hours. Subsequent distillation of the low boilers by heating under reduced pressure yielded a transparent fluid. Analysis by NMR and IR and titrimetric determination of the weight % of phenolic hydroxyl groups confirmed this fluid product to be a polyorganosiloxane having the formula

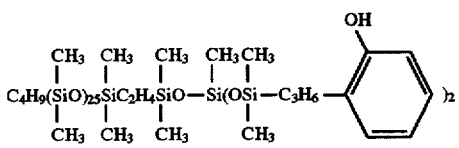

and having an OH group content of about 1.42 weight %.

EXAMPLE 2

The following were heated together for 2 hours at 100° C., 50 (g) of polymer 2 (having 10.2 milliequivalents of SiH) as described above, 3.16 g of trimethylsilyl-o-allylphenol, and a sufficient amount of platinum-tetramethyldivinyldisiloxane complex to give 10 ppm platinum metal. IR analysis of the resulting reaction mixture then confirmed that the characteristic absorption of the SiH group had disappeared. Distillation of the low boilers from the reaction mixture by heating under reduced pressure then yielded a transparent fluid. Analysis of this fluid by NMR and IR confirmed it to be a polyorganosiloxane having the formula

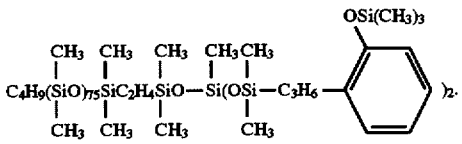

Next, about 30 g of this polyorganosiloxane and 7.97 g of methanol were mixed and then stirred at 50° C. for 3 hours. Subsequent distillation of the low boilers by heating under reduced pressure yielded a transparent fluid. Analysis by NMR and IR and titrimetric determination of the weight % of phenolic hydroxyl groups confirmed this fluid product to be polyorganosiloxane having the formula

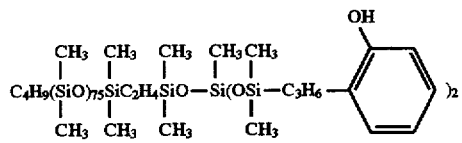

having an OH group content of about 0.56 weight %.

That which is claimed is:

1. A hydroxyphenyl-functional polyorganosiloxane compound having the formula

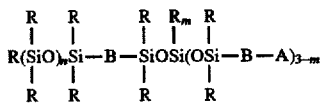

wherein R is independently a monovalent hydrocarbon group free of aliphatic unsaturation, A is a group having the formula:

wherein $R^1$ is selected from the group consisting of an alkyl group having from 1 to 4 carbon atoms and an alkoxy group having from 1 to 4 carbon atoms, and a is an integer having a value of 0 to 4, B is selected from the group consisting of alkyleneoxyalkylene groups having at least two carbon atoms and alkylene groups having at least 2 carbon atoms, m is zero or 1, and n is an integer from 0 to 400.

2. A compound according to claim 1, wherein R is independently selected from the group consisting of alkyl groups, aryl groups, and aralkyl groups.

3. A compound according to claim 2, wherein the alkyl group is selected from the group consisting of methyl, ethyl, propyl, butyl, pentyl, and hexyl.

4. A compound according to claim 2, wherein the aryl group is selected from the group consisting of phenyl, tolyl, and xylyl.

5. A compound according to claim 2, wherein the aralkyl group is selected from the group consisting of benzyl and phenethyl.

6. A compound according to claim 1, wherein A is selected from the group consisting of 2-hydroxyphenyl, 3-hydroxyphenyl, 4-hydroxyphenyl, 4-hydroxy-3-methoxyphenyl, 4-hydroxy-2-methoxyphenyl, 3-hydroxy-4-methoxyphenyl, 3-hydroxy-2-methoxyphenyl, 2-hydroxy-4-methoxyphenyl, and 2-hydroxy-3-methoxyphenyl.

7. A compound according to claim 1, wherein B is an alkylene group.

8. A compound according to claim 7, wherein the alkylene group is selected from the group consisting of ethylene, propylene, butylene, pentylene, and hexylene.

9. A compound according to claim 1, wherein B is an alkyleneoxyalkylene group.

10. A compound according to claim 9, wherein the alkyleneoxyalkylene group is selected from the group consisting of ethyleneoxypropylene and ethyleneoxybutylene.

11. A compound according to claim 1, wherein m has a value of 1.

12. A compound according to claim 1, where n is an integer of 1 to 200.

13. A compound according to claim 1, wherein the hydroxyphenyl-functional polyorganosiloxane is selected from the group consisting of

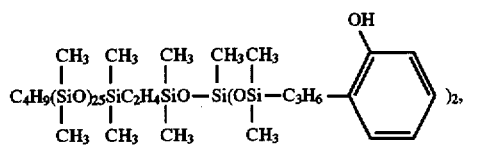

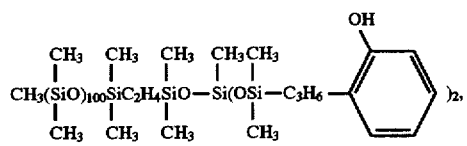

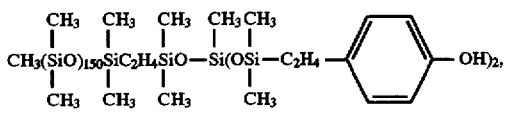

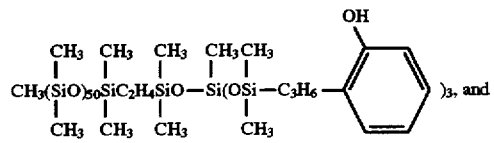

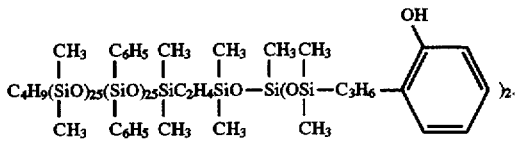

* * * * *